March 7, 1950  W. A. MARKHAM  2,499,518
CURVE SELECTOR AND SCRIBER
Filed Nov. 29, 1944  2 Sheets-Sheet 1

INVENTOR.
WILBUR A. MARKHAM
BY
ATTORNEY

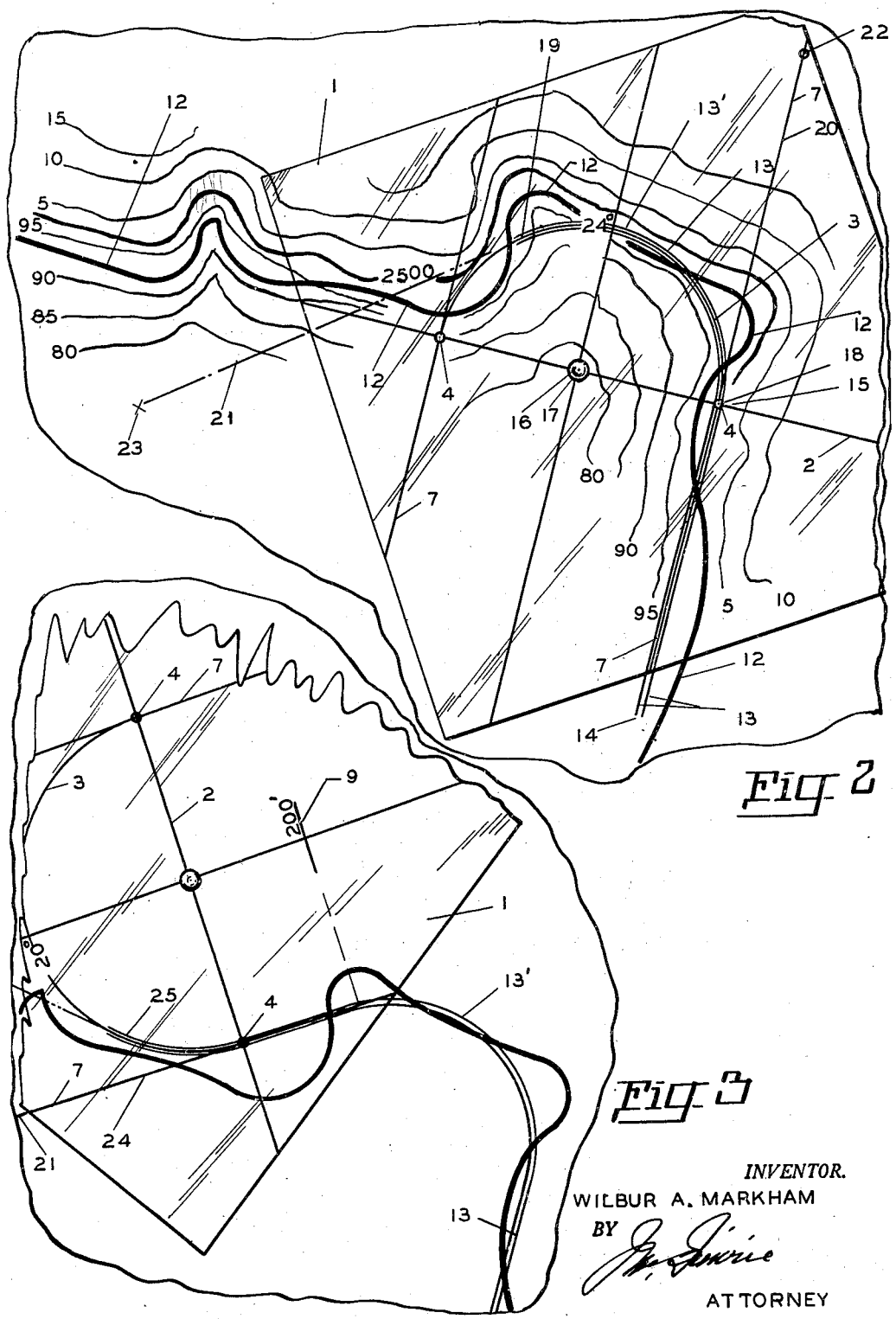

Patented Mar. 7, 1950

2,499,518

UNITED STATES PATENT OFFICE 2,499,518

CURVE SELECTOR AND SCRIBER

Wilbur A. Markham, Glenwood, Wash.

Application November 29, 1944, Serial No. 565,702

1 Claim. (Cl. 33—27)

This invention relates to curve selectors and scribers and is particularly for scribing curves on maps.

The primary object of my invention is to provide a curve scriber for drawing curves on maps, as for instance scribing the grade of a road bed on a topographic map.

My invention consists of a transparent sheet, having circles of different radius scribed thereon and having parallel lines tangent to the circles intersecting a radius line at a right angle or at the points of tangency.

By placing my new and improved curve scriber on a topographic map and aligning the parallel lines with the straight grade line on the map, then shifting the instrument over the surface of the map until the proper circle agrees with the topographic line indicated on the map for the best road grade, the instrument is then anchored to the face of the map by a suitable holding down means located within the center of the circles, then a scribe is inserted through an opening located on the circle selected and rotated about the center, scribing a line upon the map representing the final road grade.

A still further object of my invention is to combine the following features into one device, an instrument having semi-circles scribed thereon, together with their degree values. A distance scale is also provided on the face of the instrument for indicating the length of the tangent lines connected to the curves, a protractor scale for measuring the degree of angles between the tangent lines having been scribed by the device. Further a measuring scale may be scribed on the face of the instrument, all of these features being combined in the one unit.

A further object of my invention is to combine all of the above features in one instrument, eliminating the necessity of using separate individual railroad curves, as has heretofore been the custom in laying out curved graded lines on maps and the like.

These and other incidental objects will be apparent in the drawings, specification and claim.

Referring to the drawings:

Figure 1 illustrates a plan view of my new and improved curve scriber.

Figure 2 illustrates a fragmentary portion of a topographic map, showing my new and improved curve selector and scriber being used on the map. I have ilustrated one circle on the device, the one which has been selected to draw the curve. The reason for this is for simplicity of illustration.

Figure 3 is an advanced position of Figure 2, leaving out the topographic lines as illustrated in Figure 2 on the map for simplicity of illustration.

In the drawings:

Figure 1:
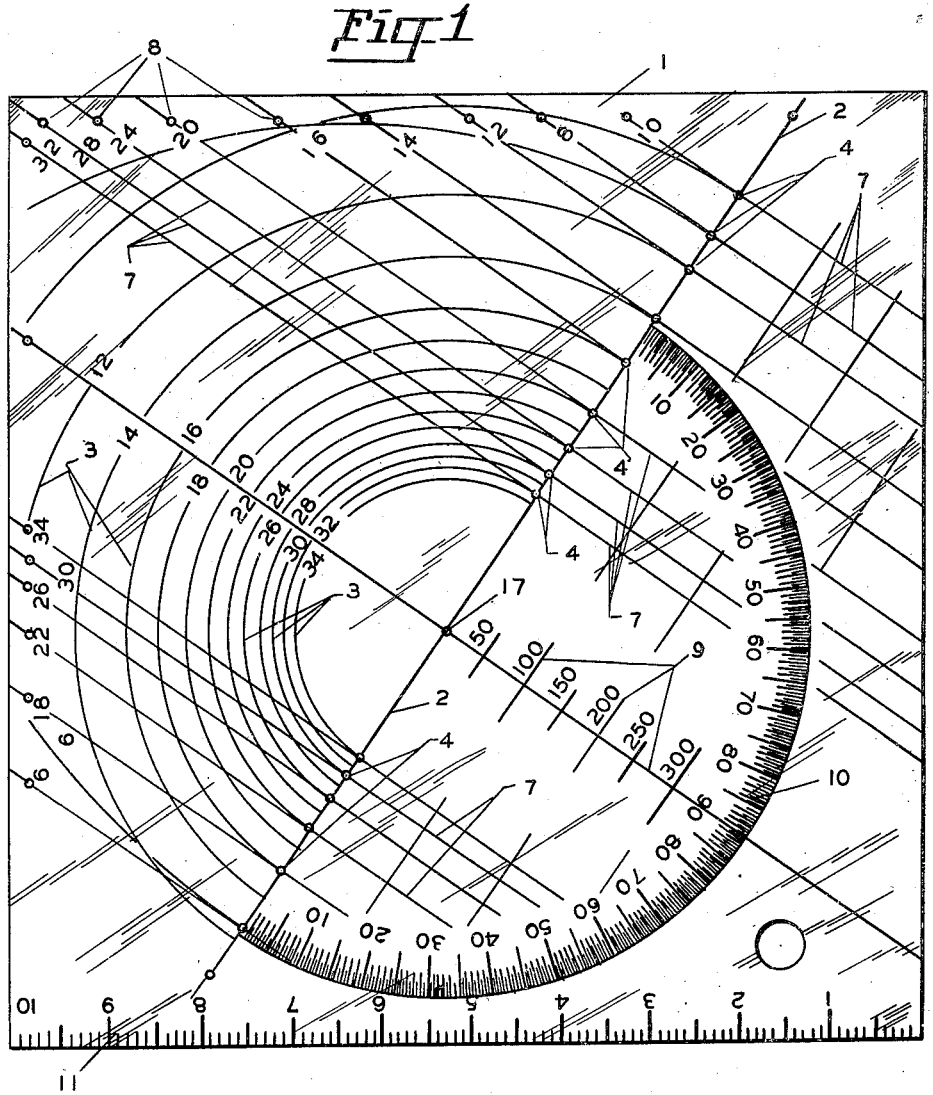
Figure 4:
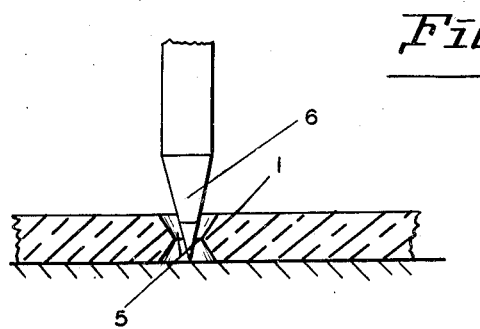
Figure 4 is a fragmentary detail of the type of hole formed in the device for inserting the scribing device.

My new and improved curve selector and scriber, as best shown in Fig. 1, comprises a transparent sheet 1, having a radius line 2 scribed diagonally of the sheet. Semicircles 3 of different radii are scribed on said sheet on one side of the radius line 2, each of said semicircles terminating at one end in holes 4 in the sheet 1 and on the line 2. The edges of the holes 4 are bevelled as at 5, as best shown in Fig 4, so that the point 6 of the scribing pencil will have freedom of movement within the holes. At right angles to the radius line 2 and tangent to the circles 3 are parallel lines 7 extending in both directions on either side of the radius line 2. These tangent lines assist in locating the final scribed curved line on the map as will hereinafter be more fully described.

Holes 8 are located on the parallel lines 7, and are provided for locating points on the face of the map by the scribing pencil. A scale 9 is scribed on the face of the instrument and is provided for indicating distances on the parallel lines 7 so that the length of tangent lines relative to the lengths of the radii of curves 3 can be readily determined, completing them with predetermined specifications on the road bed.

I have provided a protractor scale 10 for determining angles between tangents and the like that are drawn on the map. A scale 11 is provided for measuring distances without having to refer to another instrument. The protractor and scale are only added to the instrument as a convenience. My invention consists of combining the semi-circles 3 with the tangent or parallel lines 7, together with the radii line 2 for drawing curves on the map.

In the operation of my new and improved curve selector and scriber, I will first describe briefly the topographic map as indicated in Figure 2. The line 12 indicates the one percent grade line as arrived at in the usual manner on topographic maps. I have illustrated the scribed lines 13 representing the grade line as arrived at relative to the nearest grade to the one percent line 12, the line 13 as being drawn double, which would not be the case, but I have drawn it this way so that the parallel and curved lines on the instrument will show up for convenience of illustration.

The scribed lines 13 between the points 14 and 15 are drawn in a straight line and would represent a straight line grade without any curves between these points, therefore when the instrument 1 is placed on the map the parallel lines 7 are registered with the scribed line 13 between the points 14 at 15 and the curved lines 3 are shifted over the map together with their parallel lines 7 until one of the curves corresponds most nearly to the one percent line 12. The instrument then is permanently located by a thumb tack 16 entering the hole 17 of the instrument and into the face of the map. The scriber is then inserted into the hole 18, which corresponds to the hole 4 of the twenty-four degree curved line, and registered with the scribed line 13 at 15, then all that is necessary to do it to revolve the instrument about its center point 16, scribing the grade line 13 from the point 15 to the point 19 where the parallel line 20 will register with the indicated line 21 on the map, as this would appear to be the best tangent road grade line position on the map as determined by comparing the one percent grade line 12. The scribe is then passed through the hole 22, corresponding to the hole 8 of the tangent line 24 shown in Fig. 1, for scribing the location 23 on the map.

The instrument is then removed from the map and the edge of the instrument is used as a straight edge, scribing a line tangent to the scribed grade line 13 at 19 to the point 23 on the face of the map. This would indicate the location of a straight grade. The instrument is then shifted, as indicated in Figure 3, so that the tangent line 24 will register with the line as indicated at 21, as best shown in Fig. 3. In this case the twenty degree circle is the one best suited and is the one having been selected for scribing the reverse curve 25 joining the line 21.

It will be noted that the distance scale 9 indicates the length of the straight line between the curve 25 and the curve 13'. This indicates to the draftsman at a glance whether he has allowed a sufficient tangent line between curves to meet the requirements of the road bed. It can be readily understood how the protractor 10 can be adapted to indicate angle values between the tangent lines, therefore, I will not go into this detailed description.

I have illustrated how this instrument can be used to scribe curves on maps by selecting proper circles on the instrument that are best suited by drawing these curves from tangent, thereby eliminating the use of individual railroad curves as has heretofore been the custom in this operation, saving time and effort in scribing of these curves.

I do not wish to be limited to the particular construction as shown, as other forms may be used still coming within the scope of my claim.

I claim:

A curve selector and scriber comprising a transparent sheet, a straight radius line scribed substantially across said sheet, concentric semicircular arcs marked on said sheet on one side of said radius line and having their center on the radius line, said sheet having scriber receiving holes on said radius line respectively coincident with one end of each of said arcs, straight tangential lines marked on said sheet at right angles to and on both sides of said radius line, said tangential lines being respectively tangential to said arcs and passing through one of the ends of said arcs, said sheet having a scriber receiving hole on each of said tangential lines and spaced from said radius line, and a protractor scale marked on said sheet on one side of the radius line for determining angles between scribed tangents.

WILBUR A. MARKHAM.

REFERENCES CITED

The following references are of record in the file of this patent:

UNITED STATES PATENTS

| Number | Name | Date |
|---|---|---|
| 727,680 | Otis | May 12, 1903 |
| 1,245,304 | Zona | Nov. 6, 1917 |
| 2,003,172 | Burt | May 28, 1935 |
| 2,049,245 | Breitbarth | July 28, 1936 |